United States Patent [19]
Smith

[11] Patent Number: 5,931,543
[45] Date of Patent: Aug. 3, 1999

[54] WHEEL COVERS

[76] Inventor: John D. Smith, 6149 Westgate Dr. #823, Orlando, Fla. 32835

[21] Appl. No.: 08/844,296

[22] Filed: Apr. 18, 1997

[51] Int. Cl.$^6$ ...................................................... B60B 7/00
[52] U.S. Cl. .................. 301/37.28; 301/37.1; 301/37.42; 40/587
[58] Field of Search .............................. 301/37.1, 37.42, 301/37.31, 37.34, 108.1, 108.3, 37.41, 37.25, 37.26; 24/442, 575, 580; 40/587

[56] References Cited

U.S. PATENT DOCUMENTS

| | | |
|---|---|---|
| D. 105,054 | 6/1937 | Ficks . |
| D. 170,114 | 8/1953 | Dieterich ................................. D14/30 |
| D. 370,198 | 5/1996 | Starr, Sr. et al. ...................... D12/213 |
| 1,406,945 | 2/1922 | Kilborn ................................. 301/37.37 |
| 1,446,561 | 2/1923 | Harris ................................... 301/37.28 |
| 1,952,708 | 3/1934 | Gruenberg ................................ 46/48 |
| 2,124,789 | 7/1938 | Lyon ........................................ 301/37 |
| 2,279,704 | 4/1942 | Davenport ................................. 41/10 |
| 2,548,070 | 4/1951 | Ryan .................................... 301/37.25 |
| 2,558,423 | 6/1951 | Dobrosky ..................................... 31/3 |
| 2,621,081 | 12/1952 | Mann ........................................ 301/37 |
| 3,397,918 | 8/1968 | Aske, Jr. et al. ..................... 301/37.42 |
| 3,847,443 | 11/1974 | Laurion ................................ 307/37.42 |
| 3,900,652 | 8/1975 | Uraya et al. ............................. 428/92 |
| 4,344,654 | 8/1982 | Apezynski .......................... 301/108.1 |
| 4,792,191 | 12/1988 | Farmer .................................. 301/37 R |
| 4,955,113 | 9/1990 | Rajala et al. .............................. 24/448 |
| 4,955,670 | 9/1990 | Koller .................................... 301/37 R |
| 5,077,870 | 1/1992 | Melbye et al. ............................. 24/452 |
| 5,131,727 | 7/1992 | Johnson .................................. 301/37.1 |
| 5,212,853 | 5/1993 | Kaneko .................................... 24/452 |
| 5,316,376 | 5/1994 | Defreitas ............................. 301/37.25 |
| 5,457,886 | 10/1995 | Fuller ................................. 29/894.381 |

OTHER PUBLICATIONS

"Wheel Covers." U.S. Product Development Company. Zionsville, Indiana, Jan. 1964.

*Primary Examiner*—Russell D. Stormer
*Assistant Examiner*—Long Bao Nguyen
*Attorney, Agent, or Firm*—Brian S. Steinberger; Law Offices of Brian S. Steinberger

[57] ABSTRACT

Disc wheel covers for forming optical illusions such as but not limited to clockwise and counter-clockwise rotating spiral patterns. The wheel covers have fasteners which interlock to mating fasteners on the outer ring of existing wheel hubs of a vehicle in place of hubcaps or attached directly to the outside of existing hubcaps. The fasteners can be extra strong interlocking mushroom shaped fasteners and or hook and loop fasteners. The matting fasteners allow the wheel covers to be detachable when needed but allow the covers to stay on the wheel hubs as the vehicle travels up to speeds of upto approximately 140 mph or more. The spiral patterns can be various color combinations, and be reflective. Alternatively, the wheel covers can have different optical illusions, solid reflective backgrounds, and/or include advertising symbols, logos, and business names.

12 Claims, 8 Drawing Sheets

BACK OF DISK

WHEEL COVERS

This invention relates to wheel covers, and in particular to detachable wheel covers having optical illusions such as spiral patterns which cause spinning spirals to appear both in the clockwise and counter-clockwise directions on the wheels of vehicles. The novel detachable wheel covers can also have advertising symbols and logos.

BACKGROUND AND PRIOR ART

Wheel covers for vehicles such as automobiles and trucks have generally been restricted to plastic and metal type hubcaps having bendable insertable edges for covering and protecting wheel hubs. See for example: U.S. Pat. Des. 170,114 to Dieterich; Des. 370,198 to Starr, Sr. et al.; 2,124,789 to Lyon; 2,279,704 to Davenport; and 5,457,886 to Fuller. While these patents show some decorative exteriors, all the exterior shapes and forms require engraving onto the metal hubcap itself so that the hubcap becomes a permanent fixture on the vehicle's wheels. Further the shapes are not discernable to people viewing the vehicles in motion.

Some removable covers have been proposed for vehicle wheels. See for example: U.S. Pat. Nos. 4,792,191 to Farmer; and 4,955,670 to Koller. However, both of these patents are temporary shields that allow the automobile and the wheel tires to be detailed and cleaned. No decorative patterns and shapes are on the detailing shields. Furthermore, none of these shield covers can be used on the vehicles wheels when the vehicle is moving. Both Farmer and Koller require the vehicles using their shields to be stationary at a fixed location.

A spiral pattern has been proposed for a "wheel for articles of Cane or Rattan Furniture or the like." See for example U.S. Pat. Des. 105,054 to Ficks. However, this spiral pattern is integral to the "cane" and "rattan" wheel structure itself. No description, teaching, nor suggestion exists for applying this fixed wheel structure for vehicle covers. Spoke attachments have been proposed for toys such as bicycles. See for example U.S. Pat. Nos. 1,952,708 to Gruenberg; 2,558,423 to Dobrosky; and 2,621,081 to Mann. While Mann shows plural curves, the patent is restricted to attaching the curves to the spokes of bicycles and other spoke type wheels. Again, no description, teaching, nor suggestion exists for applying these spoke attached curves to vehicle wheel covers for automobiles.

SUMMARY OF THE INVENTION

The first objective of the present invention is to provide a detachable cover having an optical illusion such as a clockwise or counter-clockwise oriented spiral pattern for covering the wheel hub areas of a vehicle's wheel.

The second object of this invention is to provide a detachable cover having advertising symbols and logos for covering the wheel hub areas of a vehicle's wheel.

The third object of this invention is to provide detachable wheel covers for covering the wheel hub of a vehicle's wheels where the covers stay attached while the vehicle is moving.

A first preferred embodiment of the novel wheel cover includes a thin rigid and pliable plastic disc for substantially covering an existing wheel hub of a vehicle with an optical illusion such as a spiral pattern on an exterior side of the first rigid thin disc, the spiral pattern can be screen printed with various colors such as yellow on black, red on blue and the like. Mateable fasteners hold the disc to the wheel hub. The pattern can be a spiral clockwise or spiral counter clockwise pattern, wherein a moving illusion is formed when the vehicle moves forward or backward. A second thin rigid and pliable disc can be used for substantially covering a second existing wheel hub on a second wheel of a vehicle, having a second spiral pattern on an exterior side of the second rigid thin disc. Similar detachable fasteners attach the disc to the wheel hub. Preferably both disc covers can be used on one side of a vehicle for covering the front and rear wheel hubs. The mating fasteners can be dual interlocking locking mushroom shaped fasteners which can keep the disc covers on the wheel hubs while the vehicle travels at speed of 140 mph or more. Other optical illusion patterns such as but not limited to triangles, concentric circles, checkered patterns and the like can be used.

A second preferred embodiment of the novel wheel cover has patterns such as team names and logos, company products and services, can be used on the detachable wheel covers.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1A:
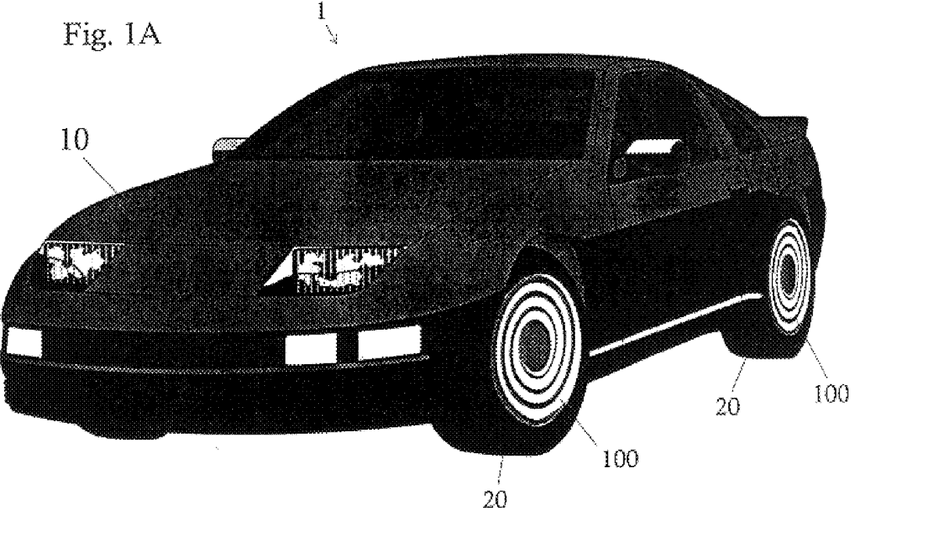
FIG. 1A shows a preferred embodiment of the novel wheel covers on the wheels of an automobile.
Figure 1B:
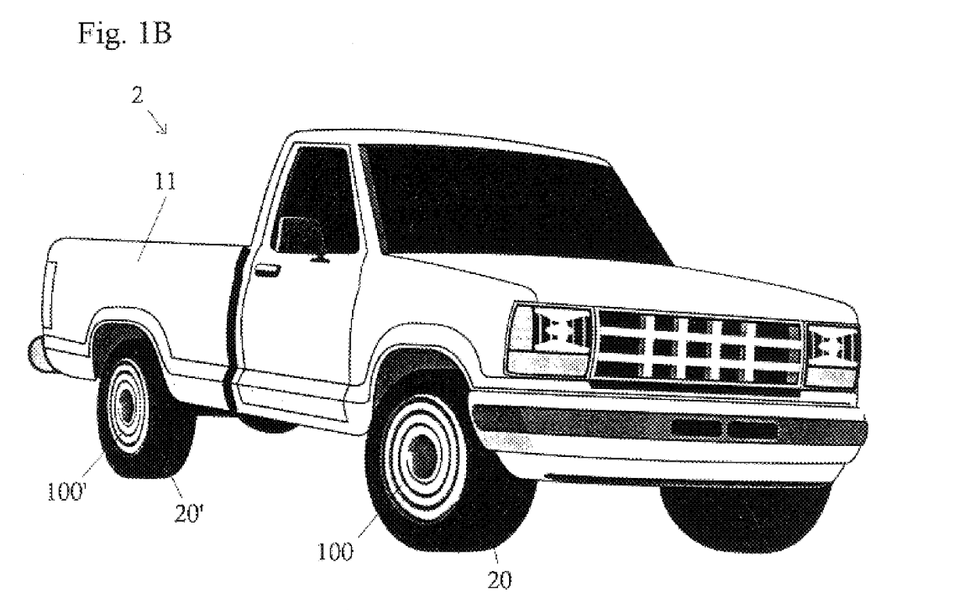
FIG. 1B is a view of the novel wheels of FIG. 1A on a truck.
Figure 2:
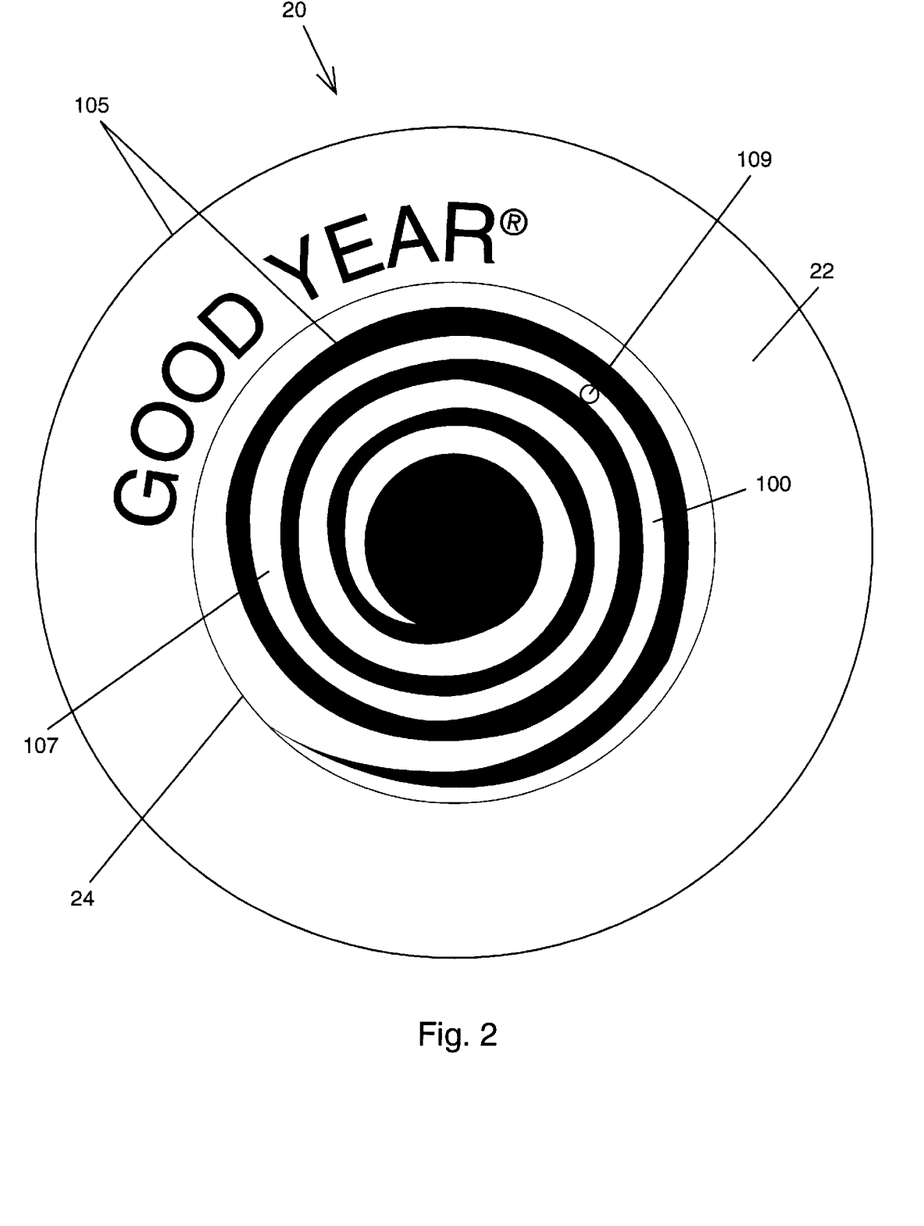
FIG. 2 is an enlarged view of a single clockwise spiral patterned wheel cover of FIGS. 1A–1B.

FIG. 1A is a side view of a preferred embodiment 1 of the novel wheel covers 100 and 100' on the wheels 20, 20' of an automobile 10. FIG. 1B is a side view of the novel wheel covers 100 and 100' on the wheels 20, 20' on a truck 11. In the preferred embodiment clockwise oriented spiral patterned wheel covers 100, 100' are placed on both the front wheel 20 and rear wheel 20' of an automobile 10 and/or truck 11. FIG. 2 is an enlarged view of a single clockwise oriented spiral patterned novel wheel cover 100 of FIGS. 1A–1B substantially covering the central hubcap area 24, while leaving the rubber tire area 22 exposed. The spiral pattern 105 can be a screen printed color neon type surface such as yellow on black background 105. Alternatively, other color combinations such as red 107 on blue 105, and the like, can be used. Color combinations can include two, or three combinations or more of all colors including red, yellow, blue, green, brown, black, purple, orange and white. The color combinations can use Glow in the Dark ink made by Naz-Dar from Chicago, Ill. Furthermore, reflective paint type materials such as reflective white, reflective silver and the like, can be used such as the reflective materials manufactured by Avery Dennison, Co., USA. Still furthermore, the optical illusions such as spiral patterns can be silk screen printed.

Figure 3:
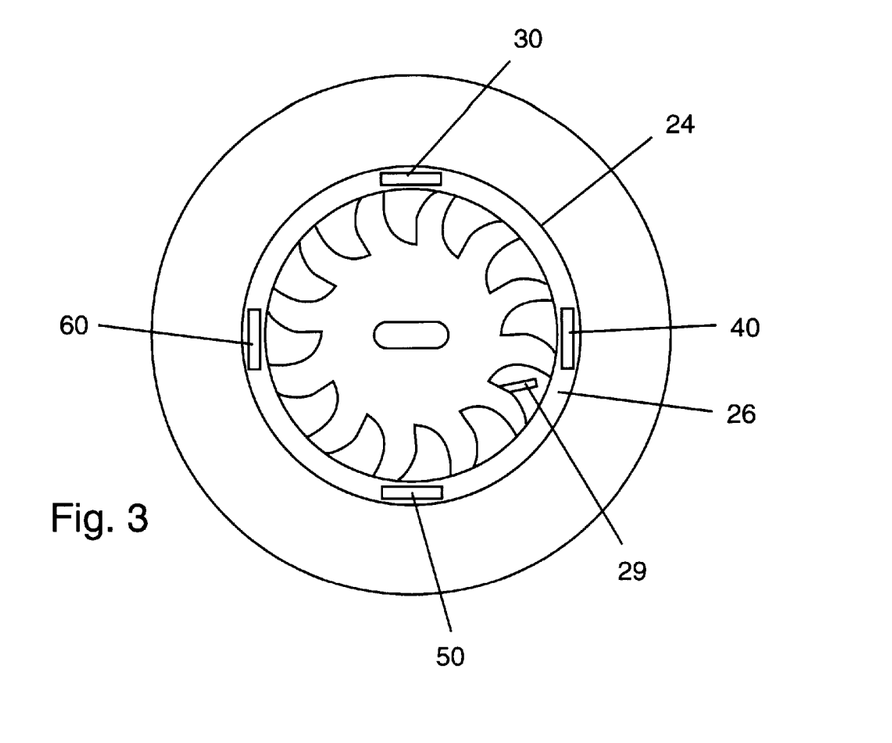
FIG. 3 is a front view of an existing exposed vehicle wheel hub of FIG. 2 having first strip fasteners attached thereto without a hubcap.

Referring to FIG. 2, disc cover 100 can be approximately 13 inches to approximately 18 and ½ inches in diameter to fit over most wheel hubs 24. Other diameter sizes can be used to provide covers for other wheel hubs. Preferably disc cover 100 can have a thickness of approximately 1 mill(1/32") to approximately 16 mills(½") thick. Pliable material used for the disc cover include but are not limited to PVC(Poly Vinyl Carbonate) such as Sintra® manufactured by the Alucobond Co. from Europe. Generally Sintra® is available in the colors of white, red, yellow, blue and green. Other types of material can be used such as Poly Carbonate, a clear plastic manufactured by Sheffield Plastics, Missouri Still other types of plastics can be used that are die cut. During a preferred method of manufacturing, no machines create the spiral patterns. Instead, a silk screen image of the spiral is screen printed in a given color onto a background color onto PVC or PC squares. Next, the printed squares can be taken to a die cutter, who cuts the circle, as well as the air-stem hole 109 which is used to expose the air-stem valve of the tire to stick out FIG. 3 is a front view of an existing exposed vehicle wheel hub 24 of FIG. 2 with outer ring 26 and air-stem valve 29, and first strip fasteners 30–60. On most conventional vehicles such as automobiles, the outer flat ring portion 26 is approximately ¼ to approximately ½ inch wide. Note that the novel wheel covers 100 of the subject invention are mounted in place of a hubcap which are used to generally cover the wheel hubs. The invention can be mounted on wheel hubs that have their hubcaps removed or alternatively on wheel hubs that do not have hubcaps. Still furthermore, the novel wheel covers 100 can be directly mounted over hubcaps directly. A perforated opening or cutout throughhole 109 is for the air-stem valve 29 of the wheel 20. Attached to the outer ring 26 at preferably four points some forty-five degrees apart from one another are first strip fasteners 30, 40, 50 and 60, which will be discussed in greater detail in reference to FIGS. 5–6. Alternatively, three mounting points approximately 120 degrees apart from one another adjacent the outer perimeter can be used. Still furthermore, more or less mounting points can be used for different size wheel covers.

Figure 4:
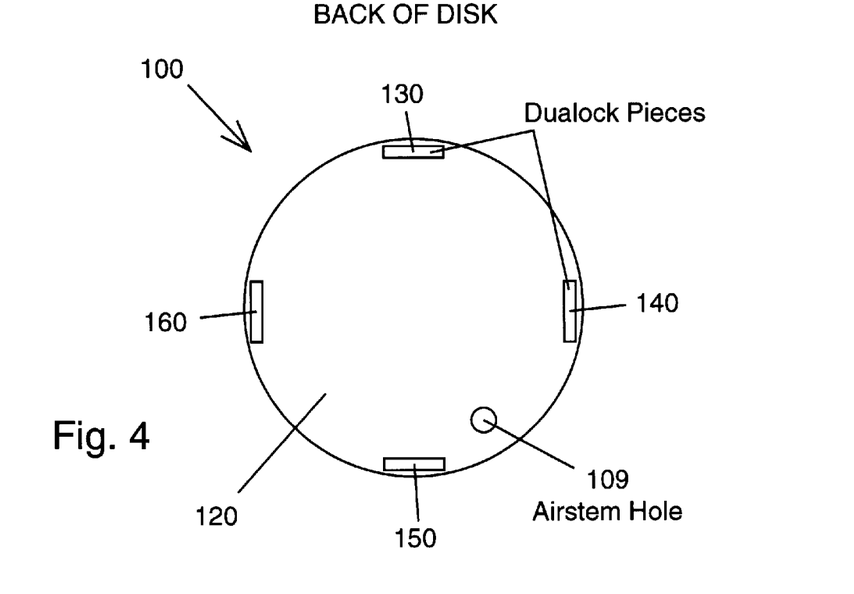
FIG. 4 is a rear view of the novel wheel cover of FIG. 2 detached from the vehicle wheel hub showing the matching strip fasteners.

FIG. 4 is shows a rear side 120 of the novel wheel cover 100 of FIG. 2 detached from the vehicle showing matching second strip fasteners 130, 140, 150, and 160 which are oriented opposite to first strip fasteners 30, 40, 50 and 60 of FIG. 3. Each of the fastener strips can be approximately 1 inch wide by 1&½ inch long by approximately ½ to ¾ of an inch thick.

Figure 5:
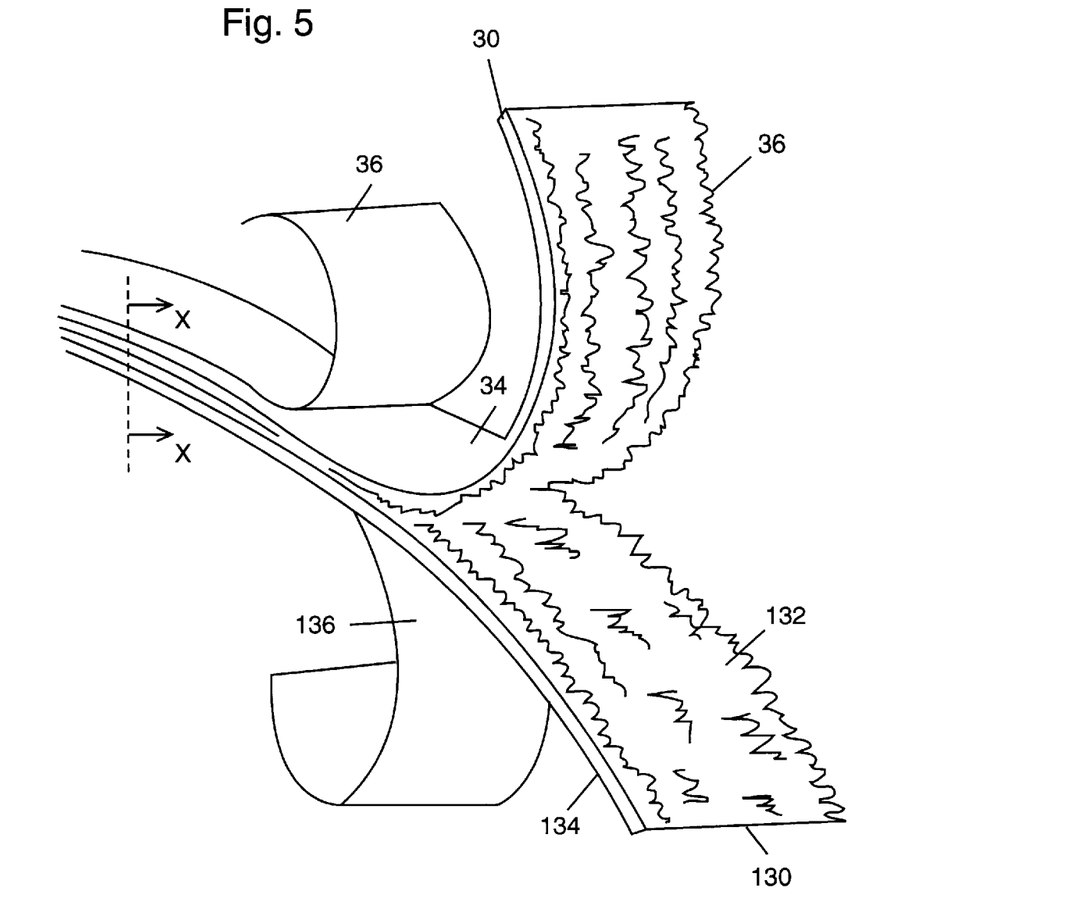
FIG. 5 is a view of the preferred first and second fasteners used to attach the novel wheel cover to the wheel hub.
Figure 6:
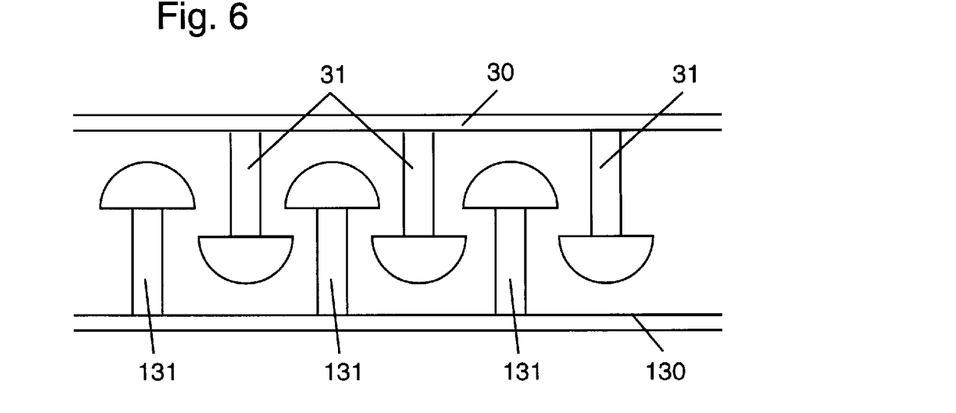
FIG. 6 is a cross-sectional view of the mushroom caps of FIG. 5 along arrow X fastened to one another.

FIG. 5 is a view of the preferred first 30 and second strip fasteners 130 of FIGS. 3–4 that are used to attach the novel wheel cover to the wheel hub. FIG. 6 is a cross-sectional view of the mushroom caps of FIG. 5 along arrow X fastened to one another. Referring to FIGS. 5–6, the preferred detachable matching fasteners 30 and 130 used in the novel invention can be Dual Lock™ Industrial fasteners numbers 400 and 200 manufactured by 3M™ Industrial Tape and Specialities Division of St. Paul, Minn., having mushroom shaped opposing fasteners 31 and 131 facing and interlocking with one another, and peelable off paper exterior layers 36 and 136 which expose adhesive surfaces 34 and 134. The Dual Lock™ fasteners have been factory tested for holding a static shear and tensile weight of approximately 500 to approximately 1000 grams per square inch at the temperature range of approximately −20 F.(−29 C.) through approximately 200 F.(93 C.). Tested variations have used fasteners 31 which was identified as 3M™ model 250, being approximately 250 mushrooms per square inch and fasteners 131 used on the rear 120 of the disc cover 100 being approximately 500 mushrooms per square inch. For ease in operation peelable layer 36 can be black in color while peelable layer 136 can be clear in color so that the user will know which fastener to apply to the disc cover 100 and to the wheel hub 24. In use adhesive surface area 34 is attached to the outer ring 26 of wheel hub 24(shown in FIG. 3) and adhesive surface area 134 is attached to the rear surface 120 of wheel cover 100(shown in FIG. 4). The preferred embodiment 100 has been tested on race cars at the Walt Disney World Speedway in Orlando, Fla., for up to approximately 140 miles per hour.

Figure 7:
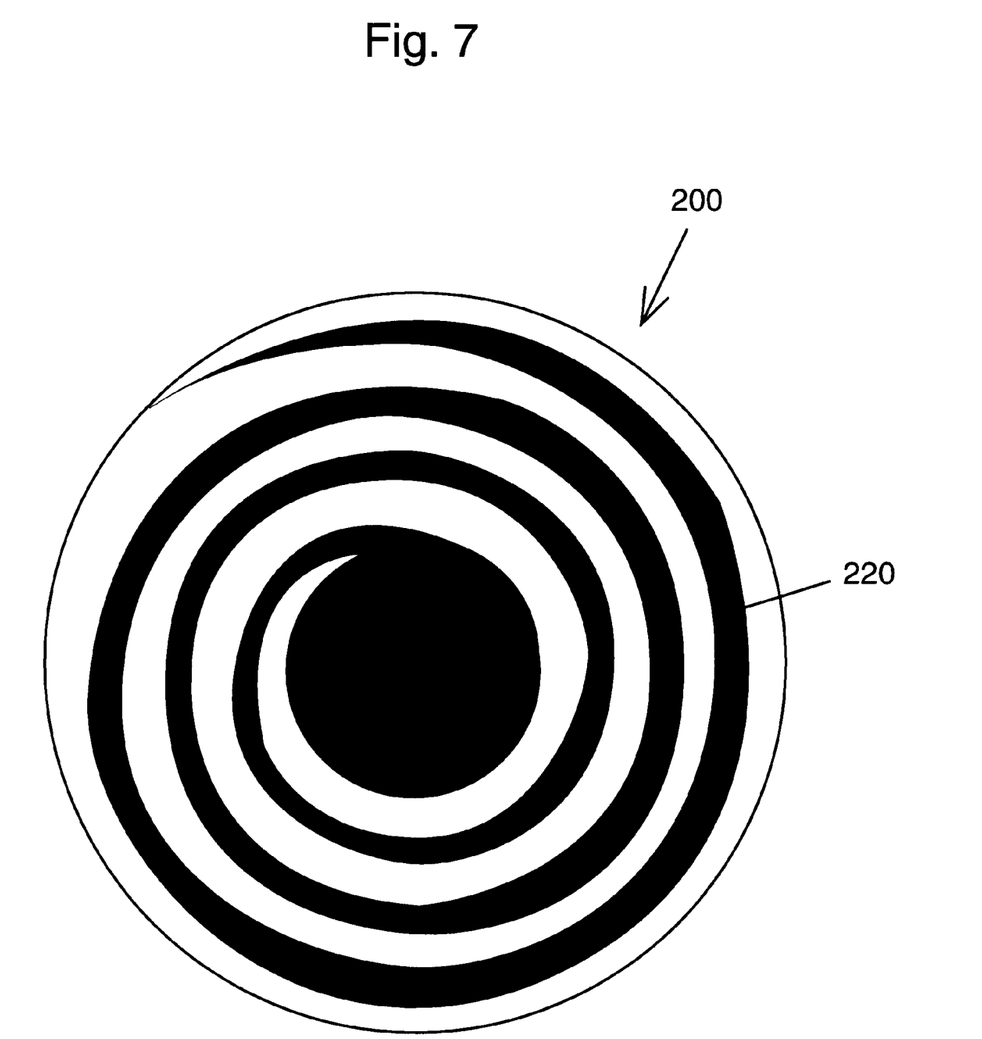
FIG. 7 is an enlarged view of a counter-clockwise oriented spiral patterned novel wheel cover.

FIG. 7 is an enlarged view of a counter-clockwise oriented pattern 220 on the exterior of another novel wheel cover 200. While the embodiments above describe spirals, the invention can be applied to other patterns that create an optical illusion when the wheel covers are spinning.

Figure 8:
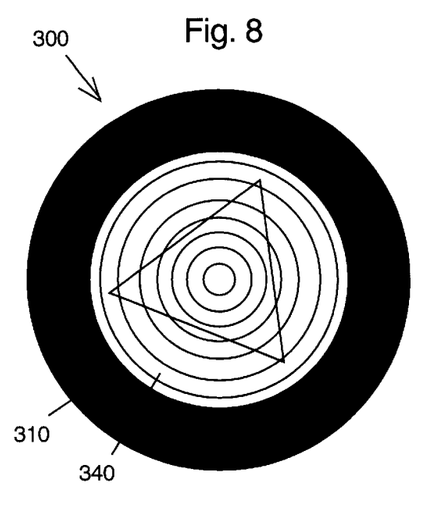
FIG. 8 shows the novel wheel cover with a triangle formed over concentric circles.
Figure 9:
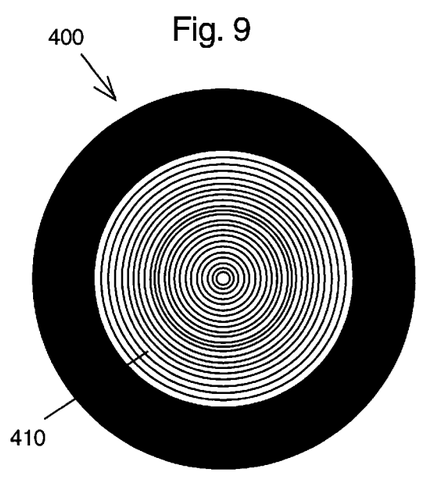
FIG. 9 shows the novel wheel cover with closely spaced concentric circles.
Figure 10:
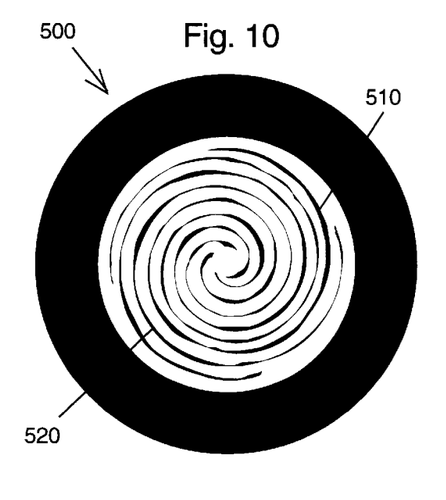
FIG. 10 shows the novel wheel cover with plural concentric spiral patterns.
Figure 11:
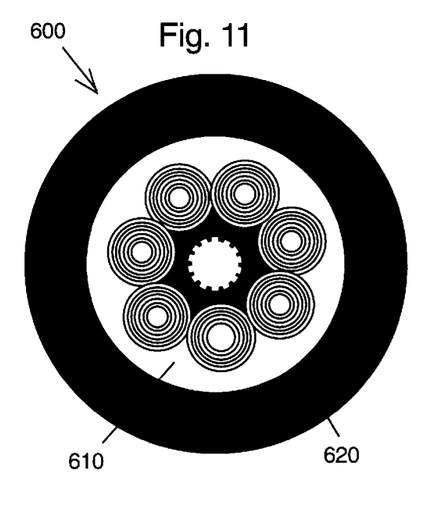
FIG. 11 shows the novel wheel cover with plural groups of concentric circles in a circle.
Figure 12:
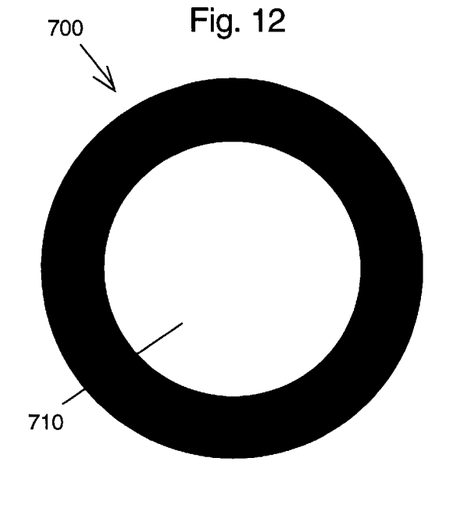
FIG. 12 shows the novel wheel cover with a solid color surface such as a reflective surface.
Figure 13:
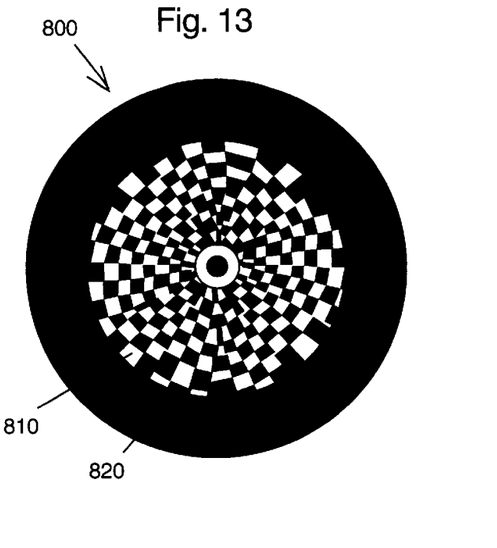
FIG. 13 shows the novel wheel cover with concentric rings of checkerboard patterns.
Figure 14:
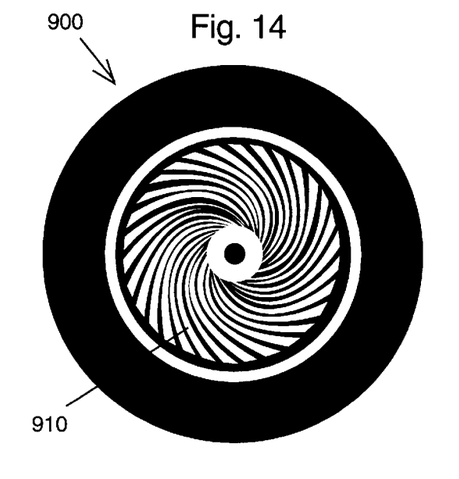
FIG. 14 shows the novel wheel cover with multiple curved lines in a spiral pattern.
Figure 15:
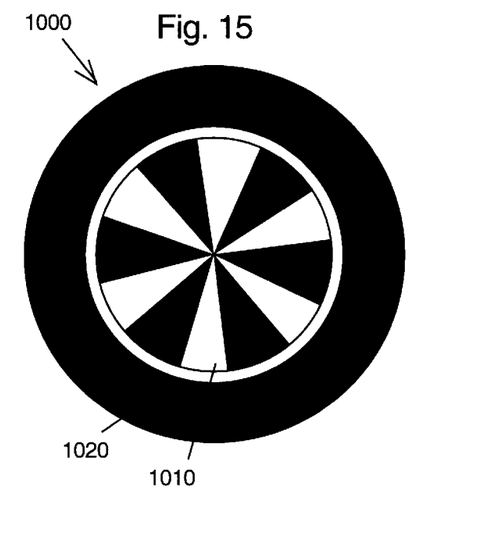
FIG. 15 shows the novel wheel cover with alternating black and white triangle patterns.

FIG. 8 shows the novel wheel cover 300 with a triangle 340 formed over concentric circles 310 wherein the spinning wheel causes an optical illusion effect. FIG. 9 shows the novel wheel cover 400 with closely spaced concentric circles 410. FIG. 10 shows the novel wheel cover 500 with plural concentric spiral patterns 510, 520, 530. FIG. 11 shows the novel wheel cover 600 with plural groups of concentric circles 610 in a circle about a sprocket shape 620. FIG. 12 shows the novel wheel cover 700 with a solid color surface 710 such as a reflective white, silver, and color surface. FIG. 13 shows the novel wheel cover 800 with concentric rings of checkerboard patterns 810, 820 with the outer rings larger than the inner rings. FIG. 14 shows the novel wheel cover 900 with multiple curved lines 910 in a flared spiral pattern. FIG. 15 shows the novel wheel cover 1000 with alternating black and white triangle patterns 1010, 1020. Alternatively, the triangles can be different color combinations such as red and yellow and the like.

Figure 16:
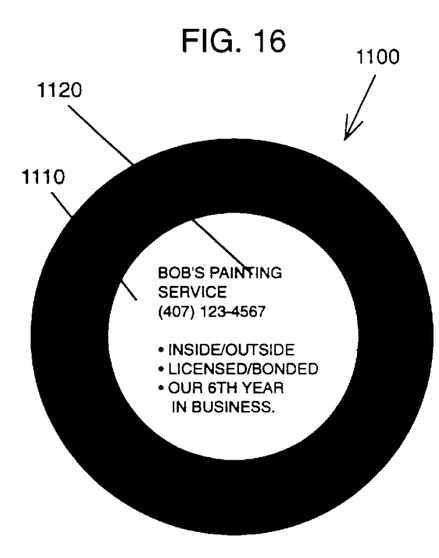
FIG. 16 shows the novel wheel cover with a light background and advertising which can represent a business name.
Figure 17:
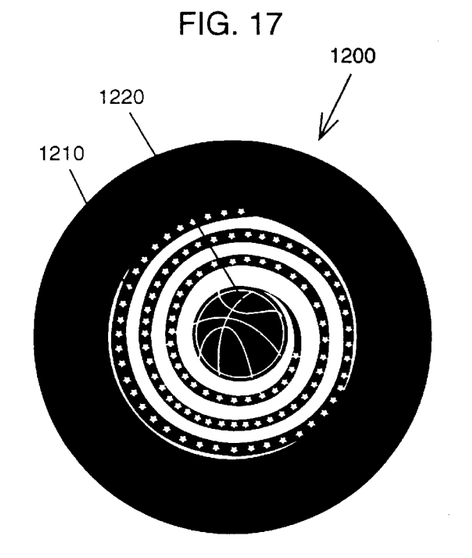
FIG. 17 shows the novel wheel cover with a spiral having stars, and a center circle that can have a sport's team logo.
Figure 18:
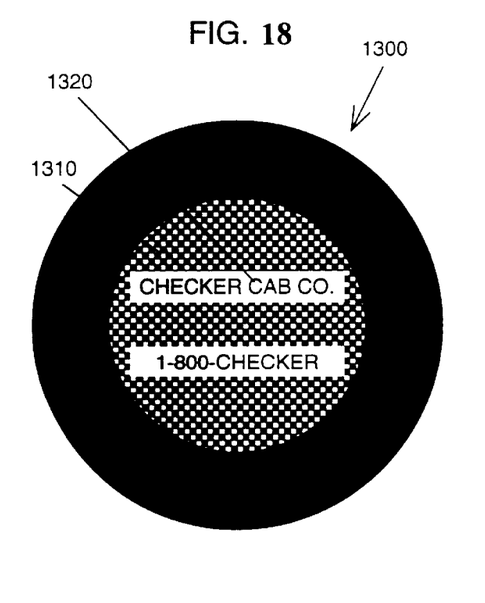
FIG. 18 shows the novel wheel cover with a checkered pattern background and business names across the background.

FIG. 16 shows the novel wheel cover 1100 with a light background 1110, such as white, and advertising 1120, which can represent a business name. FIG. 17 shows the novel wheel cover 1200 with a spiral 1210 having stars, and a center circle 1220 that can have a team logo such as a basketball. FIG. 18 shows the novel wheel cover 1300 with a checkered pattern background 1310 and business names 1320 arranged in blocks across.

While the preferred embodiment has described using Dual Lock™ Industrial fasteners by 3M™, other types of high static shear resistant detachable fasteners such as nylon and plastic hook and loop fasteners such as an industrial strength Velcro® and the like having an increased attachment strength can be used.

Although the preferred embodiment has described using the novel detachable wheel covers for automobiles, the novel detachable wheel covers can be used over the hubcap area for trucks, recreational vehicles(RVs), towed trailers, motorcycles having spokeless wheels, and bicycles having spokeless wheels.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A spiral patterned wheel cover for covering wheel hubs, the cover when rotating with the wheel hubs forming an optical illusion when moving forward, comprising:

a first thin rigid and pliable solid plastic disc for substantially and directly covering an existing wheel hub of a vehicle, the disc having a diameter of approximately 13 inches to approximately 18 and ½ inches, and the disc having a thickness of approximately $\frac{1}{32}$ to approximately ½ and inch;

perforated opening adjacent to a side edge of the disc forming a removable portion that can be punched out to form an opening for an airstem valve;

wherein said removable portion is replaceable in the opening of the wheel cover to complete the spiral pattern;

a first spiral pattern on an exterior side of the first rigid thin disc, the removable portion being part of the spiral pattern; and a first set of dual detachable interlocking fastener means having a static shear and tensile weight of approximately 500 to approximately 1000 grams per square inch for holding the first disc to the wheel hub while the vehicle travels through speeds of approximately 140 mph, wherein the first disc stays on the wheel hub and forms a moving spiral pattern while the vehicle is moving in a forward direction.

2. The spiral patterned wheel cover of claim 1, further comprising:

a second thin rigid and pliable solid plastic disc for substantially and directly covering a second existing wheel hub on a second wheel of a vehicle and not covering a hubcap nor a trim ring, the second disc having a diameter of approximately 13 inches to approximately 18 and ½ inches, and the disc having a thickness of approximately $\frac{1}{32}$ to approximately ½ an inch;

a second spiral pattern on an exterior side of the second rigid thin disc;

a second set of dual detachable interlocking fastener means having a static shear and tensile weight of approximately 500 to approximately 1000 grams per square inch for holding the second disc to the second wheel hub, wherein the second disc stays on the second wheel hub and forms a moving spiral pattern while the vehicle is moving in a forward direction.

3. The spiral patterned wheel cover of claim 2, wherein the first disc covers a front wheel of one side of the vehicle, and the second disc covers a rear wheel on the one side of the vehicle so that the first disc and the second disc are side-by-side.

4. The spiral patterned wheel cover of claim 1, wherein the first set of dual detachable interlocking fastener means includes:

approximately 250 mushroom shaped fasteners per square inch on the wheel hub; and approximately 500 mushroom shaped fasteners per square inch on the disc.

5. The spiral patterned wheel cover of claim 2, wherein the first set and the second set of dual detachable interlocking fastener means each includes:

approximately 250 mushroom shaped fasteners per square inch on the wheel hub; and approximately 500 mushroom shaped fasteners per square inch on the disc.

6. The spiral patterned wheel cover of claim 1, wherein the first set of detachable fastener includes:

plural detachable fasteners adjacent the outer perimeter of the exterior side of the first rigid thin disc for attaching to mateable fasteners on the outer flat ring of the existing wheel hub.

7. The spiral patterned wheel cover of claim 6, wherein the plural detachable fasteners further include:

four detachable fasteners placed approximately ninety degrees from one another.

8. The spiral patterned wheel cover of claim 1, wherein the first spiral pattern includes:

reflective coloring.

9. The spiral patterned wheel cover of claim 1, wherein the first spiral pattern includes:

a first colored spiral on a different colored background.

10. The spiral patterned wheel cover of claim 1, wherein the first spiral pattern includes:

an advertising symbol in the middle of the first spiral pattern.

11. The spiral patterned wheel cover of claim 1, wherein the first disc is formed from:

PVC(Poly Vinyl Carbonate).

12. The spiral patterned wheel cover of claim 1, wherein the first disc is formed from:

PC(Poly Carbonate).

* * * * *